March 3, 1970     L. G. GHEEN     3,498,314
MOVABLE IRRIGATION LINE
Filed May 24, 1967     3 Sheets-Sheet 1
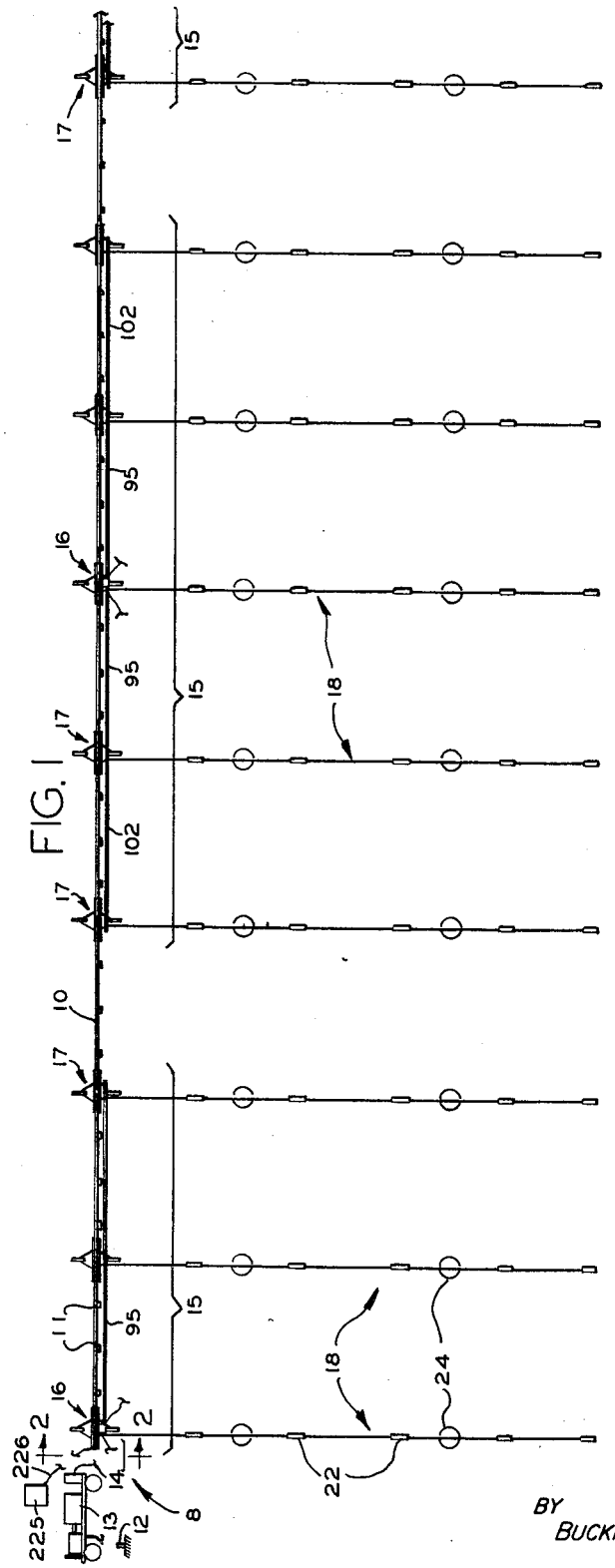
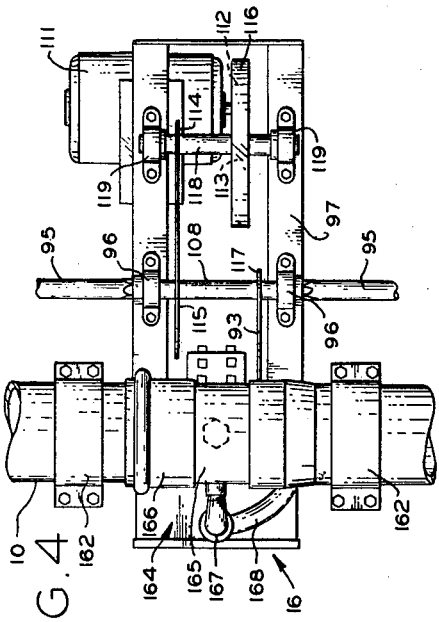
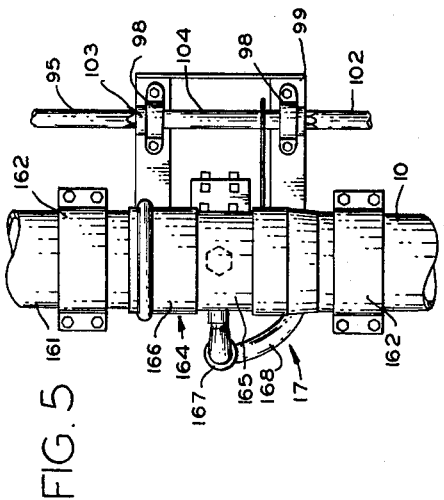
LYNDLE G. GHEEN
INVENTOR
BY
BUCKHORN, BLORE, KLARQUIST & SPARKMAN
ATTORNEYS March 3, 1970

L. G. GHEEN 3,498,314

MOVABLE IRRIGATION LINE

Filed May 24, 1967

LYNDLE G. GHEEN
INVENTOR

BY
BUCKHORN, BLORE, KLARQUIST & SPARKMAN
ATTORNEYS

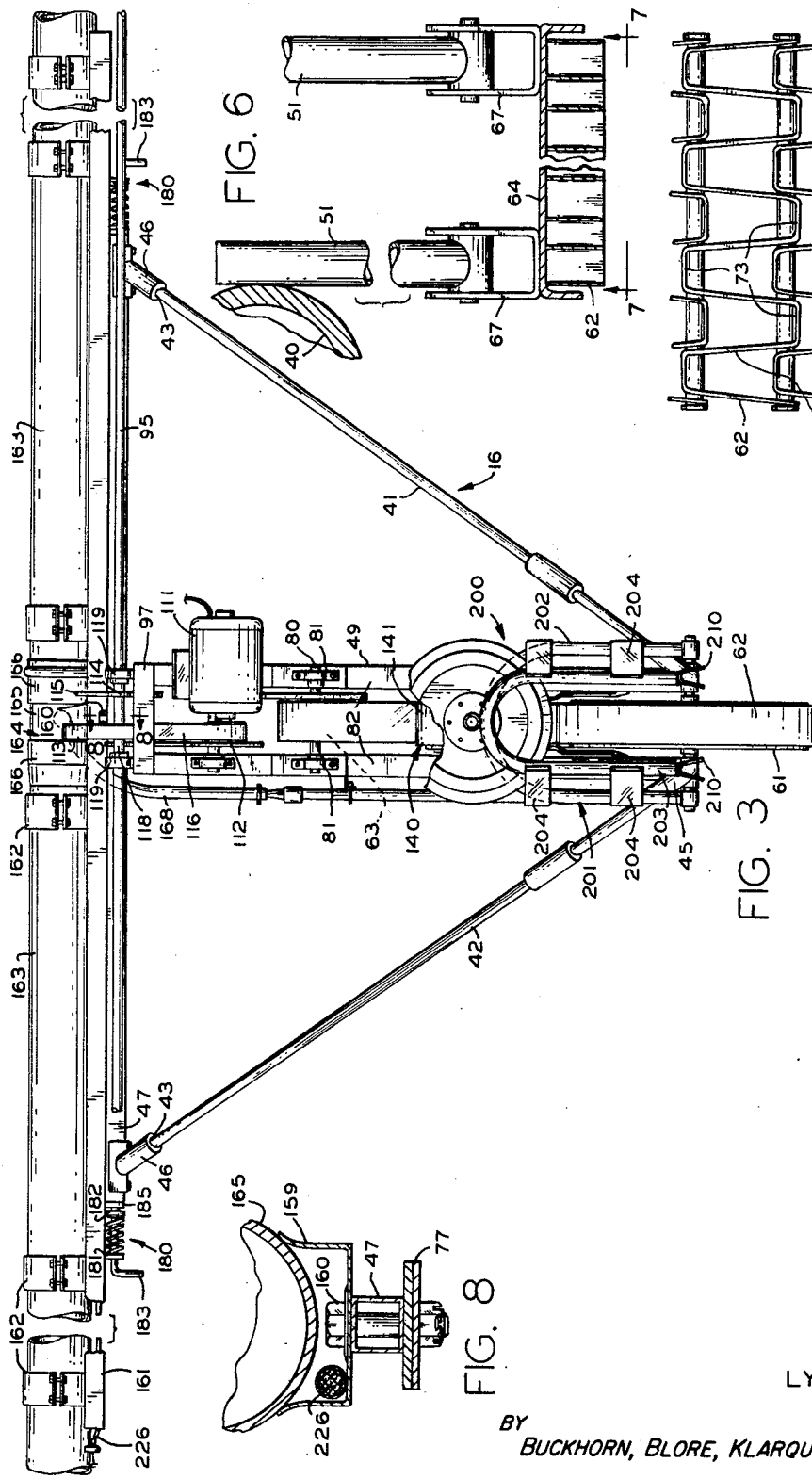

United States Patent Office 3,498,314
Patented Mar. 3, 1970

3,498,314
MOVABLE IRRIGATION LINE
Lyndle G. Gheen, Eugene, Oreg., assignor to R. H.
Pierce Manufacturing Company, Eugene, Oreg., a
corporation of Oregon
Filed May 24, 1967, Ser. No. 640,991
Int. Cl. A01g 25/02
U.S. Cl. 137—344         14 Claims

ABSTRACT OF THE DISCLOSURE

A movable irrigation line including a pipe carried by a plurality of carriages each supporting a cradle and the carriages being arranged in groups with one of the carriages of each group carrying a motor which drives a line shaft driving the other carriages of the group. Each carriage is connected adjustably to its cradle to drive the cradle either at right angles to the cradle or at an acute angle to the cradle. Each carriage includes a pair of vertical posts supporting a longitudinal member pivoted to the cradle for adjustment of the carriage relative to the cradle. The posts are supported by horizontal bottom sides of a pair of inclined triangular frames connected at their upper ends to the ends of the longitudinal member. The ends of the horizontal sides journal axles carried by wheels around which an endless, open mesh supporting track travels. The track also travels along a guide shoe extending between the wheels. A drive sprocket supported by the posts is driven by the line shaft which is carried by the posts. A pair of auxiliary wheels are pivotal on the axles between normal retracted positions and operating positions supporting the wheels and track above the ground for moving the line longitudinally. Each carriage also supports a branch pipe connected to a trailing line extending to the rear thereof and carrying sprinklers.

Description

This invention relates to a movable irrigation line, and more particularly to an irrigation line carried by a plurality of driven carriages.

Self-driven movable irrigation lines known hitherto have been of two types. One type has been that in which the sprinkler pipe or a line shaft parallel thereto is rotated by a tractor unit having a prime mover and in turn supplies power to a plurality of carriages to advance the carriages along the tractor unit. One disadvantage of such a line is that it is very difficult to maintain all the carriages and the tractor abreast of one another so that the pipe is not bent excessively. In the other type of movable irrigation lines, the pipe is supported by a plurality of carriages each provided with a prime mover, which makes the cost very high. Another problem of the prior art lines is that of providing sufficient flotation or area of support of the carriages to keep them from becoming bogged down or mired in areas of soft ground. Another problem of the prior art lines is that it is difficult to keep the carriages from slipping sidewise when on a side hill or slope.

An object of the invention is to provide a new and improved movable irrigation line.

Another object of the invention is to provide a new and improved irrigation line carried by a plurality of driven carriages.

A further object of the invention is to provide an irrigation line having a pipe supported by groups of carriages of which one of the carriages of each group carries and is driven by a prime mover and others of the carriages of each group are also driven by the prime mover of the one carriage.

Another object of the invention is to provide in a movable irrigation line a lightweight, easily assembled, high flotation carriage.

Another object of the invention is to provide a movable irrigation line in which a pipe is carried by a plurality of carriages attached to the pipe for individual angular adjustment relative to the pipe to compensate for varying side slippage.

A further object of the invention is to provide a movable irrigation line carriage in which bottom sides of a pair of triangular bracing frames are supported by wheels or pulleys and support central posts attached to the central portions of a cradle which is connected to the bracing frames at points spaced outwardly from the posts.

The invention provides a movable irrigation line including an elongated pipe carrying sprinklers and supported and movable by carriages. Preferably the carriages are arranged in groups with at least one of the carriages of each group carrying and driven by a prime mover which also drives other carriages of the group with the prime movers of the different groups being individually controlled. Each carriage may comprise an endless, open mesh, chain-type track coursing over a pair of wheels carried by axles secured to the apices of a pair of triangular, tubular bracing frames having parallel bottom sides and extending upwardly and angularly away from each other to the ends of an elongated horizontal member which at its central portion pivotally supports a cradle and which is lockable to the cradle at different angles relative to the cradle. The top of the track abuts a shoe carried by the frames. A pair of vertical posts secured to the bottom sides of the bracing frame and to the horizontal member support a drive for the track. A pair of forks pivotal on the axles carry wheels, and are movable between retracted positions when the line is to be moved transversely to the pipe and operative positions supporting the line in an elevated position with the tracks above the ground when the line is to be moved longitudinally of the pipe.

A complete understanding of the invention may be obtained from the following detailed description of a movable irrigation line forming a specific embodiment thereof, when read in conjunction with the appended drawings, in which:

FIG. 1 is a fragmentary, top plan view of a movable irrigation line forming one embodiment of the invention;

FIG. 3 is an enlarged, elevation view taken along line 3—3 of FIG. 2;

FIG. 4 is an enlarged, fragmentary top plan view of a portion of the movable irrigation line of FIG. 1;

FIG. 5 is an enlarged, fragmentary, top plan view of a portion of the movable irrigation line of FIG. 1;

FIG. 6 is an enlarged, vertical sectional view taken along line 6—6 of FIG. 2;

FIG. 7 is an enlarged, bottom plan view taken along line 7—7 of FIG. 6; and

FIG. 8 is an enlarged, vertical sectional view taken along line 8—8 of FIG. 3.

Figure 2:
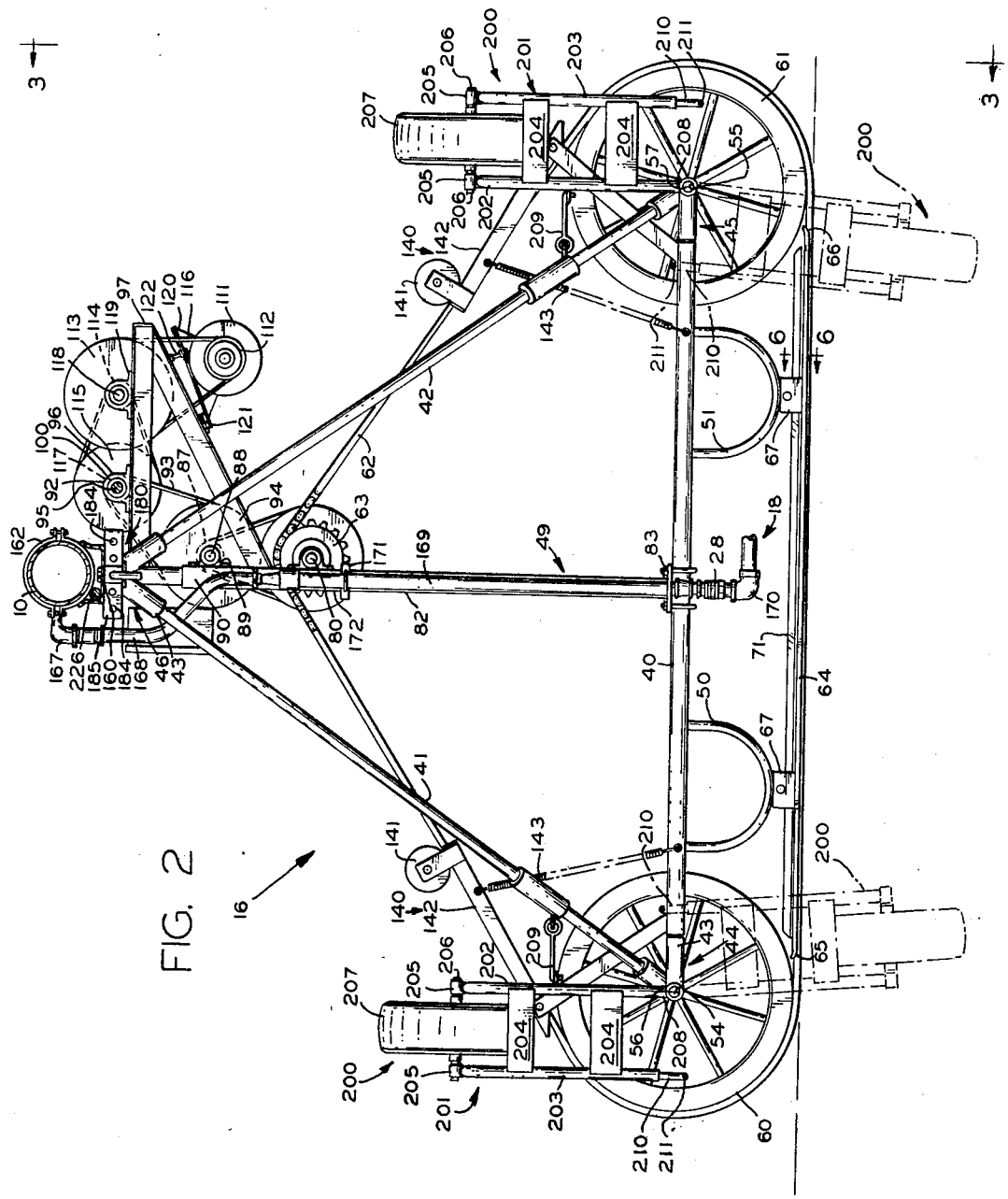
FIG. 2 is an enlarged, vertical sectional view taken along line 2—2 of FIG. 1.

Referring now in detail to the drawings, there is shown therein a movable irrigation line 8 forming one embodiment of the invention and including a pipe 10 carrying thereon sprinklers 11 at spaced points therealong and supplied with water from a fixed pipeline 12 through a pump unit 13 and a hose 14. The pipeline 10 is carried by carriage groups 15, each having one drive carriage 16 and a plurality of driven carriages 17 spaced along the pipe. The pipe 10 supplies water to the sprinklers 11 and to trailer lines 18, which carry combined risers and sprinklers 22 and have wide stabilizers or skids 24. In one arrangement, the line 8 is placed near one end of one-half of a field and sprinkles that portion. The user then moves the line through the carriages 16 and 17 to the next position and this area is sprinkled. When the end of the field is reached and sprinkled, the trailer lines 18 are detached by means of quick detachable, swivel couplings 28 (FIG. 2), the line 8 is towed endwise to the other half of the field, the trailer lines are attached to the other side of the line 8 and the carriages 16 and 17 are driven in the reverse direction to move the line 8 back along the other half of the field.

The carriages 16 and 17 are adapted to carry the pipe 10, which may be any one of widely varying types, and have high traction and flotation, each carriage resting on a large area of the ground for support and traction. Each carriage is of an inexpensive construction in which it, while in disassembled form, can be transported in a compact, lightweight package, the components of which can be easily and quickly assembled. Each carriage has a lightweight, strong, rigid framing in which metal pipes or legs 40, 41 and 42 fit into and are pinned to sockets 43 of couplers 44, 45 and 46.

The two couplers 46 of each carriage are bolted or brazed to the end portions of a top, horizontal beam 47 to rigidly connect to the beam 47 the upper ends of triangular frames formed by the pipes 40, 41 and 42 and the couplers 44, 45 and 46. The bottom pipes 40 are rigidly connected together in parallel positions by a rigid rectangular frame 49 and rigid, spacing frames 50 and 51 positioned between the pipes 40 and fastened thereto. The couplers 44 and 45 have bores 54 and 55 therein through which axles 56 and 57 extend. The axles are pinned to the couplers, and mount rotatably thereon wide wheels or pulleys 60 and 61 around which course an endless, open mesh chain or track 62 is driven by a sprocket 63. A backing shoe or plate 64 in the form of a reinforced, inverted channel having curved ends 65 and 66 is secured by brackets 67 to the rigid frames 50 and 51. The shoe 64 is engaged by the lower course of the chain 62. The shoe includes a longitudinal stiffener 71 and extends substantially completely from the wheel 60 to the wheel 61 and is tangent to the bottom portions of the wheels.

The chain 62 (FIGS. 6 and 7) is of the open mesh type which is commonly used for some types of conveyors and permits dirt or the like to pass therethrough. The chain includes interleaved, sinuous sheet metal links 72 pivotally secured together by transverse rivets or pins 73. This construction gives excellent traction and is light in weight. The flexing of the chain as it travels around the wheels 60 and 61 tends to break loose and drop all dirt or the like which has entered the open mesh. The lower portions of the wheels 60 and 61 and the shoe 64 which covers the entire width of the chain prevents mud or dirt from passing completely through the chain and thus tends to prevent the chains from sinking deeply into mud. The chain, wheels and shoe are quite wide and the shoe is long so that a large area of engagement with the ground is provided to give high flotation to the carriage.

The sprocket 63 (FIG. 2) is supported by and keyed to a shaft 80 journaled by bearings 81 carried by central posts 82 of the frame 49. The posts 82 are secured to lower plates 83 rigidly secured to the central portions of the pipes 40 by eyebolts 84 and also are secured to upper plates 77 (FIG. 8) bolted or brazed to the bottom of the central portion of the beam 47. The shaft 80 (FIG. 2) is driven by a sprocket 85, a chain 86 and a sprocket 87 driven by a shaft 88 journaled in bearings 89 fixed to sleeves 90 adjustably pinned to the posts 82. The shaft 88 is driven by a line shaft 91 through a sprocket 92, a chain 93 and a sprocket 94. The sprocket 92 is keyed to a short shaft 108 (FIG. 4) supported by bearings 96 carried by a frame 97 secured to the beam 47 and the posts 82. Line shaft sections 95 extend from splining couplings 100 on the short shaft of the driving carriage 16 to the adjacent driven carriages 17 of the group of carriages. The line shaft sections 95 are connected to splining couplings 103 (FIG. 5) secured to short shafts 104 carried by bearings 98 carried by frames 99 of the driven carriages. Line shaft sections 102 are connected between the short shafts 104 of the driven carriages to transmit power to the end driven carriages of each group 15 of carriages.

The shaft 108 of each group of carriages is driven by an electric motor 111 (FIGS. 2, 3 and 4) through geared pulleys 112 and 113, sprockets 114 and 115, a timing belt 116 and a sprocket 117. The sprocket 115 is keyed to the shaft 108 and the pulley 113 and sprocket 114 are keyed to a shaft 118 carried by bearings 119 carried by the frame 97. The motor 111 is mounted on a plate 120 supported adjustably on the frame 97 by a hinge 121 at one end of the plate 120 and an adjustment screw 122 at the other end of the plate 120. Of course, only the driving carriages 16 have the motors 111 and the driving trains of belts and pulleys and chains and sprockets between the motors 111 and the short shafts 108.

Belt-tighteners 140 (FIG. 2) on the carriages 16 and 17 each includes a roller 141 pressing against the track 62 and carried by an arm 142 pulled downwardly by a spring 143. The arms 142 are mounted for pivotal movement by frames 144 secured to the pipes 40.

The beam 47 of each of the carriages 16 and 17 of a group is secured pivotally at the center of the beam 47 by a bolt or pin 160 (FIGS. 2 and 3) to an elongated, upwardly facing channel-like cradle 161, which is substantially longer than the beam, each cradle being slightly greater than twice the length of the beam and extending beyond the ends of the beam, for the entire span of that group. The cradles support the pipeline 12, which is clamped rigidly to each cradle by split strap clamps 162 the lower halves of which are brazed to the cradle at the ends of the cradle and at spaced points along the cradle. The pipeline 12 is composed of a series of sections or lengths 163 which are connected together at their ends by coupling joints 164 which are positioned over the central portions of the carriages 16 and 17 and resting on flared flange portions 159 (FIG. 8). Each joint 164 includes a central tubular member 165 fitting into and sealed by gaskets (not shown) to end sleeve members 166. A street elbow 167 connects the interior of the member 165 to a host 168, which is connected by a vertical pipe 169 to a pipe elbow 170 and the coupler 28 of the trailer line 18. The pipe 169 is carried by a bracket 171 carried by a sleeve 172 fixed rigidly to the pipe 82 and supporting one of the bearings 81.

Each cradle 161 carries latches 180 (FIGS. 2 and 3) each comprising lugs or ears 181 and 182 slidably mounting a latch bolt 183 which is urged toward a latching position extending into a selected one of holes 184 about one degree apart in an arcuate plate 185 carried rigidly on the end of the beam 47 and centered on the bolt 160. The latching bolts may be pulled manually to releasing positions to permit the beam 47 to be turned on the bolt 160 until other holes 184 are aligned with the latching bolts 183. The latching bolts then are released and are spring pressed into the holes 184 to lock the beam 47 in angularly adjusted position relative to the cradle 161. Thus, each of the carriages 16 and 17 can be individually adjusted angularly relative to the cradles 16 and the pipe 10. This permits adjustment of each carriage to the terrain over which that carriage will travel to compensate for side slippage and also to keep the pipe 10 substantially straight. For example, if a given carriage is to travel along the side of a slope and therefore will slip sidewise downhill, that carriage is turned to an angle from the perpendicular to the pipe 10 and facing somewhat uphill. Then, as the carriage travels along, it will travel uphill sufficiently to compensate for its tendency to slip sidewise downhill. Thus, all the carriages may be adjusted to travel at right angles to the pipe 10 regardless of the differences in terrain over which they travel. To keep the pipe 10 tensioned, each of the first two or three carriages adjacent the end carriages on the pipe 10 can be towed out about one degree.

In order to move the irrigation line longitudinally, as, for example, to a second half of a field having a first half which has just been irrigated, each of the carriages 16 and 17 has a pair of wheeled, auxiliary supports 200 (FIGS. 2 and 3). The supports are mounted for movement between upper, normal or retracted positions shown in full lines and lower, elevating positions shown in broken lines. Each support includes a rigid, forked frame 201 comprising a pair of tubular, U-shaped members 202 and 203 fastened rigidly together by braces 204 and carried by bearings 205 supported by axles 206 on which wheels 207 are mounted. The members 202 have on their ends sleeves 208 pivotally mounting the frames 201 on the outer ends of the axles 56 and 57. Releasable latches 209 carried by the frames 144 normally hold the frames 201 in their retracted positions. Each member 202 has a pair of forks 210 at its ends, and each fork 210, when the frame 201 is in its operative position, brackets one of the pipes 40 and is secured to the pipe 40 by a pin (not shown) passed through holes 211 in the fork 210. As best shown in FIG. 2, the frames 201 are slightly over-center and slope inwardly relative to the carriage framing so that the weight of the carriage tends to lock the frames 201 in their operative positions. This also facilitates the adjustment by the user of the frames from their retracted positions to their operative positions since the user will first lift one end of the carriage and swing one of the frames 201 down to its operative position while the other end of the carriage rests on the wheel 60 or the wheel 61 and the lowered frame 201 will be vertical under its end of the carriage even though the other end of the carriage is lower. Hooks of a forked cable (not shown) are secured to the end cradle and to the plate 83 of the frame 49 for pulling the line by means of a tractor.

Operation

The motor 111 (FIG. 3) of each carriage 16, there being one carriage 16 for each group 15 (FIG. 1), is energized through a controller 225 at a central location which may be at the pump unit 14 or at some other convenient location. Each motor 111 is individually controlled by a rheostat or other suitable control of the controller 225 and connected to the motor by wires of a cable 226 supported from the pipe 10 by pipe hangers (not shown). This provides individual control of the speed of each carriage 16 so that alignment of the groups 15 is maintained. Each motor drives the line shaft sections 95 and 102 (FIG. 2) of the group 15 to drive the carriages 16 and 17 at the same speed. The carriages 16 and 17 move the line 10 upwardly, as viewed in FIG. 1, along the field, and the sprinklers 11 and 24 sprinkle the field. When one-half of the field has been irrigated, the supports 200 are swung down to and latched in their operative positions, the towing cable is hooked to the upper and lower portions of the frame of the end carriage, and the line is towed endwise by a tractor to the other half of the field. The trailer lines 18 then are coupled to the couplings 28 after the latter have been swung to positions extending oppositely to the positions shown in FIG. 1, the couplings 28 being swivels to enable the trailer lines to trail either side of the line 10. The supports 200 are then swung to and latched in their retracted positions, the carriages 16 and 17 of each group 15 are adjusted angularly if necessary relative to the cradle, the pump unit 14 is started and the motors 111 are started to move the line back along the other half of the field, the motors being run in the reverse direction from that in which they were run in covering the first half of the field.

The above arrangement of the several groups of carriages with each group individually driven and controlled provides high maneuverability to the line. For example, the line can be swung to the left, as viewed in FIG. 1, by starting the extreme righthand group of carriages several seconds before starting the next group, which in turn is started several seconds before the next and so on along the line until the extreme lefthand group of carriages is started. The flexibility of the pipe between the groups permits the limited swinging between adjacent groups. After starting the line of course if straight and the swinging movement ceases. This provides for considerable movement laterally relative to the direction of travel. However, for large movements it is better to utilize the auxiliary wheels and pull the line endwise. The speed of the several groups also may be individually adjusted by the controller 225 to execute turning or swinging movements if desired. The carriages 16 and 17 are light in weight, have high flotation and each group 15 is controlled individually in speed to provide excellent alignment. The tracks 62 have good traction, are light in weight and are self-cleaning. Each of the carriages is simple and inexpensive, while being strong and rugged, in its construction. The carriages can be easily assembled and disassembled. The above arrangement of several carriages in each group all driven by only one motor 111 for each group provides economy while the several groups for the line enables the line to be kept straight. The individual angular adjustment of each of the carriages prevents compression of the line 10 and also enables compensation for slip of those of the carriages which travel along a side hill.

It is to be understood that the above-described arrangements are simply illustrative of the application of the principles of the invention. Numerous other arrangements may be readily devised by those skilled in the art.

What is claimed is:
1. In a movable irrigation line,
an elongated pipeline,
a plurality of drive carriages supporting the pipeline at spaced points therealong,
a plurality of driven carriages supporting the pipeline and positioned in groups between the drive carriages,
a plurality of prime movers mounted on the drive carriages,
a plurality of individual coupling means each drivingly connecting one of the prime movers to one of the groups of driven carriages,
and control means for individually regulating the prime movers.

2. The movable irrigation line of claim 1 wherein the coupling means includes a plurality of shafts extending between the drive carriages and the driven carriages, and a plurality of traction mechanisms on the driven carriages driven by the shafts.

3. The movable irrigation line of claim 2 including means connecting the carriages adjustably for different angles relative to the pipeline, the shafts having flexible portions compensating for different angles of adjustment of the carriages relative to the pipeline.

4. The movable irrigation line of claim 3 wherein the flexible portions of the shafts are universal joints.

5. The movable irrigation line of claim 3 wherein each shaft includes a plurality of separate sections and the universal joints connect the separate sections together.

6. The movable irrigation line of claim 1 including a plurality of adjustable connectors connecting a plurality of the carriages for individual angular adjustment of the last-mentioned carriages relative to the pipeline.

7. The movable irrigation line of claim 6 wherein the connectors and last-mentioned carriages are near the ends of the pipeline, whereby the last-mentioned carriages can be toed outwardly to tension the pipeline.

8. In a carriage for a movable irrigation line,
frame means for supporting a pipe,
an elongated, rigid shoe supporting the frame means, an endless track coursing along and under the shoe,
the endless track comprising open, undulating links of sheet metal strips partially nesting together and pin means connecting the links pivotally together,
and drive means for moving the track along the shoe.

9. The carriage of claim 8 wherein the shoe is channel-like and downwardly facing and the track lies between the sides of the shoe.

10. In a carriage for a movable irrigation line,
frame means for supporting a pipe,
a flexible, endless, supporting and driving track comprising an open mesh chain,
and an elongated shoe supporting the frame means and comprising a downwardly facing, rigid channel member having a base portion resting on the track and downwardly extending side flanges bracketing and guiding the track.

11. The carriage of claim 10 wherein the open mesh chain comprises a plurality of open, zig-zag links of sheet metal strips overlappng each other and pin means pivotally connecting the links together.

12. In a carriage for a movable irrigation line,
cradle means for supporting an irrigation pipe and comprising an elongated, rigid, upwardly facing channel member adapted to have the irrigation pipe clamped thereto and extending therealong,
a pair of triangular frame members having parallel horizontal base portions and extending upwardly and away from each other,
upper beam means connecting the upper ends of the frame members at widely spaced points,
vertical pivot means connecting the central portion of the upper beam means to the central portion of the channel member,
releasable latch means on the beam means and the cradle member adapted to hold the beam means and the cradle member against pivotal movement relative to each other in any selected one of a plurality of positions,
lower beam means rigidly connecting together the base portions of the frame members,
and movable support means mounted on the base portions and adapted to engage the ground.

13. The carriage of claim 12 wherein the channel member extends at each end substantially beyond the upper end of the adjacent frame member.

14. In a carriage for a movable irrigation line,
cradle means for supporting an irrigation pipe,
a pair of triangular frame members having parallel horizontal base portions and extending upwardly and away from each other,
upper means connecting the upper ends of the frame members to the cradle means at widely spaced points,
lower means rigidly connecting together the base portions of the frame members,
movable primary support means mounted on the base portions and adapted to engage the ground,
and auxiliary support means including a pair of auxiliary wheels and a pair of forks mounting the wheels and pivotal on the frame members between lower positions supporting the frame members and the primary support means in elevated positions and upper, retracted positions in which the primary support means rests on the ground.

References Cited

UNITED STATES PATENTS

| | | | |
|---|---|---|---|
| 1,966,783 | 7/1934 | Balaam | 239—212 |
| 2,665,169 | 1/1954 | Tipton | 137—344 |
| 3,175,635 | 3/1965 | Bryan | 239—212 XR |
| 3,202,172 | 8/1965 | Bergeron et al. | 137—344 |
| 3,286,723 | 11/1966 | Purtell | 239—212 XR |
| 3,339,576 | 9/1967 | Skins | 239—212 XR |
| 3,355,109 | 11/1967 | Kane | 239—213 |
| 3,360,200 | 12/1967 | Purtell | 239—213 |
| 3,370,606 | 2/1968 | Kane | 239—212 XR |
| 3,385,315 | 5/1968 | Decoto et al. | 239—212 XR |
| 3,394,729 | 7/1968 | Bower et al. | 239—212 XR |

SAMUEL SCOTT, Primary Examiner

U.S. Cl. X.R.

239—212, 213

PO-1050
(5/69)

UNITED STATES PATENT OFFICE
CERTIFICATE OF CORRECTION

Patent No. 3,498,314      Dated March 3, 1970

Inventor(s) Lyndle G. Gheen

It is certified that error appears in the above-identified patent and that said Letters Patent are hereby corrected as shown below:

Column 3, line 35, after "62" should be inserted -- which -- .

In the references, "Skins" should be -- Skains -- .

SIGNED AND
SEALED
JUL 14 1970

(SEAL)
Attest:

Edward M. Fletcher, Jr.
Attesting Officer

WILLIAM E. SCHUYLER, JR.
Commissioner of Patents